United States Patent [19]
Thomson

[11] Patent Number: 5,493,786
[45] Date of Patent: Feb. 27, 1996

[54] REAL ESTATE ELECTRO TAPE

[76] Inventor: Christopher S. Thomson, 9500 Seabrook Dr., NE., Albuquerque, N.M. 87111

[21] Appl. No.: 370,519

[22] Filed: Jan. 9, 1995

[51] Int. Cl.$^6$ .............................. G01B 7/02; G01B 11/02
[52] U.S. Cl. ..................... 33/1 G; 33/784; 33/DIG. 21; 364/562
[58] Field of Search ............... 33/1 G, 1 P, 228, 33/275 R, 276, 277, 278, 279, 280, 285, 290, 292, 700, 760, 783, 784, 791, 792, 794, DIG. 21; 364/561, 562, 563, 564

[56] References Cited

U.S. PATENT DOCUMENTS

| | | |
|---|---|---|
| 572,816 | 10/1945 | Wallis . |
| 2,548,590 | 4/1951 | Cook ........................ 33/791 |
| 3,590,704 | 6/1971 | Endo ..................... 33/275 R |
| 3,897,637 | 8/1975 | Genho . |
| 3,908,281 | 9/1975 | Fox . |
| 4,586,150 | 4/1986 | Budziak et al. ................ 364/562 |
| 5,287,627 | 2/1994 | Rando . |

FOREIGN PATENT DOCUMENTS

| | | | |
|---|---|---|---|
| 55-63775 | 5/1980 | Japan .......................... 33/1 P |
| WO89/10538 | 11/1989 | WIPO .......................... 33/290 |

*Primary Examiner*—William A. Cuchlinski, Jr.
*Assistant Examiner*—G. Bradley Bennett
*Attorney, Agent, or Firm*—Michael I. Kroll

[57] ABSTRACT

A real estate electro tape is provided that measures the length of an interior or exterior wall or other similar structure using optical means. A sonic tape is used to measure the perpendicular distance from the device to the interior or exterior wall. Two steerable lasers are then used to determine the angles between the perpendicular and the beams aimed at the wall edges. An algorithm is applied to the angular and perpendicular distance data to obtain the length of the wall. A microprocessor performs the calculations, the results of which are displayed on an electro optical display.

10 Claims, 2 Drawing Sheets

$$L \text{ TOTAL} = H \text{ TAN } \theta_1 + H \text{ TAN } \theta_2 + 2L'$$

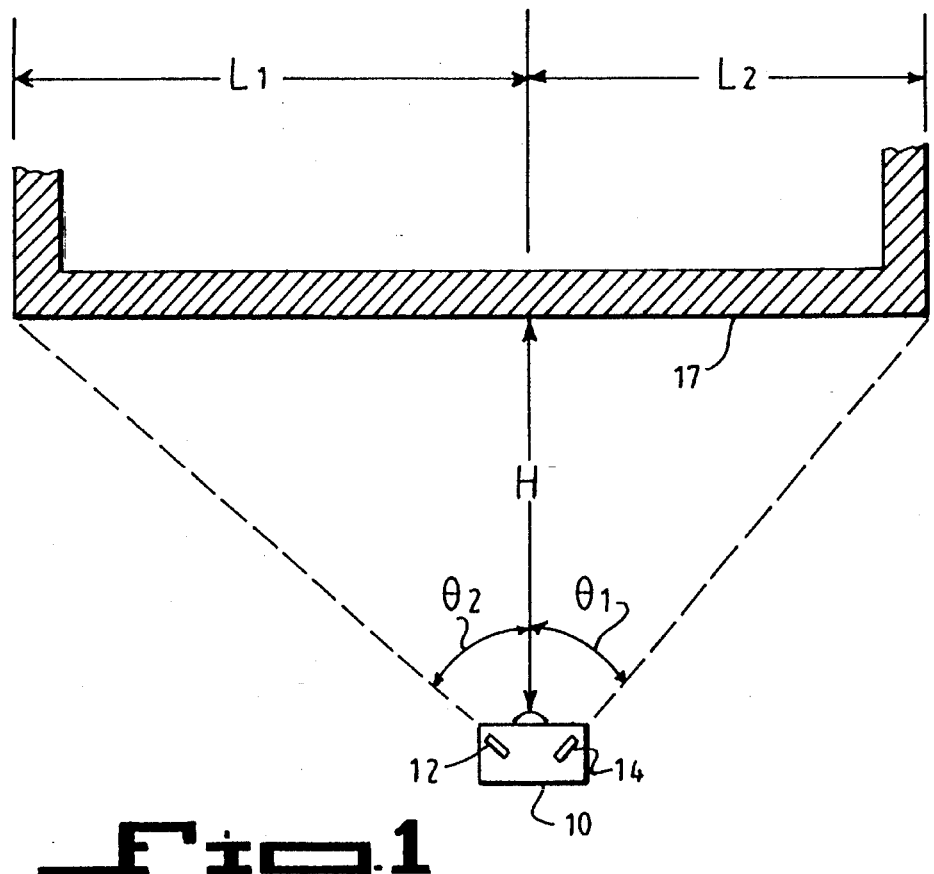
Fig.1
$$L_{TOTAL} = H \tan \theta_1 + H \tan \theta_2 + 2L'$$
Fig.2
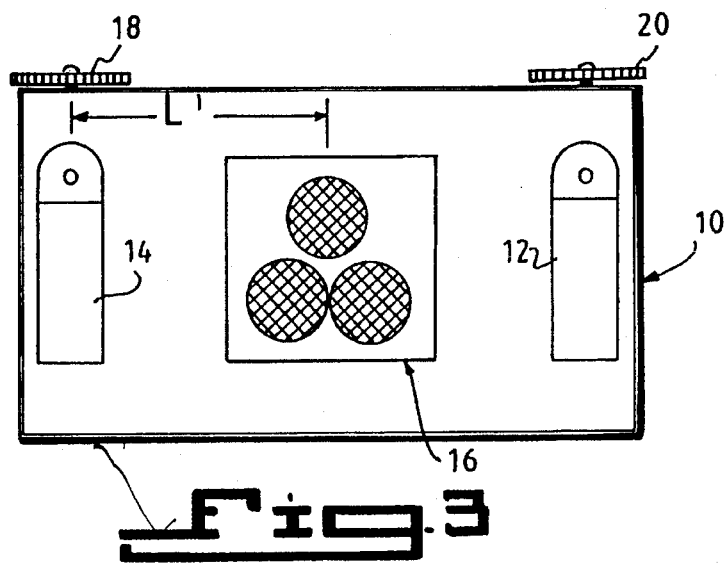
Fig.3

REAL ESTATE ELECTRO TAPE

BACKGROUND OF THE INVENTION

The instant inventions relates, generally, to the field of measurement instruments, and, more specifically, to devices that measure the length of an interior or exterior wall by indirect optical means.

In many fields of endeavor, such as real estate appraisal, architecture, engineering, and building inspection, it is necessary to measure the length of an interior or exterior wall. It is often difficult to get close enough to the wall to use, for instance, a measuring tape due to obstructions, vegetation, or jags in the direction of the wall.

A number of measuring solutions have been suggested. M. Fox (U.S. Pat. 3,908,281) suggests a real estate appraisal instrument and method. However, this instrument requires that an object of known dimension be observed and such an object is not always available. R. Genho (U.S. Pat. 3,897,637) proposes a laser level and square that does not provide any measuring means but merely provides a laser-generated line that defines a level. J. Rando (U.S. Pat. 5,287,627) provides an automatic plumb and level tool with acoustic measuring capability. This device is very useful in providing a means for measuring the distance to a laser-illuminated object but does not provide means for measuring the length of the object itself.

SUMMARY OF THE INVENTION

It is, therefore, a primary object of the present invention to provide a real estate electro tape that can be used to measure the length of an interior or exterior wall without direct contact with the wall.

A further object is to provide a real estate electro tape which uses optical methods to measure the length of an interior or exterior wall.

Another object is to provide a real estate electro tape which measures the length of an interior or exterior wall with a fairly high degree of accuracy.

A further object is to provide a real estate electro tape which measures the length of an interior or exterior wall quickly and with little training.

A further object is to provide a real estate electro tape which is simple and inexpensive to fabricate.

A yet further object is to provide a real estate electro tape that has an easy to read display.

To the accomplishment of the above and related objects, this invention may be embodied in the form illustrated in the accompanying drawings, attention being called to the fact, however, that the drawings are illustrative only and that changes may be made in the specific construction illustrated and described within the scope of the appended claims.

BRIEF DESCRIPTION OF THE DRAWING FIGURES

The figures in the drawings are briefly described as follows:

FIG. 1 is a diagrammatic view of the invention shown in use measuring the length of a wall.

FIG. 2 illustrates the algorithm used by the invention.

FIG. 3 is a front view of the invention.

Figure 4:
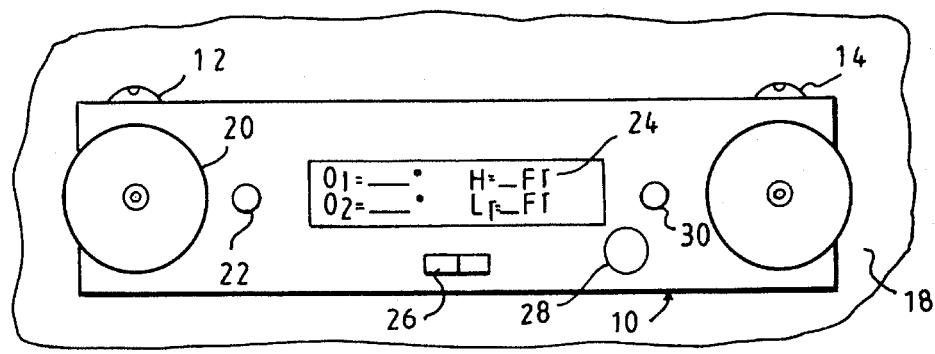
FIG. 4 is a top view of the invention showing the controls and display thereof.

| COMPONENT LIST | |
|---|---|
| Reference | Description |
| 10 | REAL ESTATE ELECTRO TAPE |
| 12 | Steerable Laser #2 |
| 14 | Steerable Laser #1 |
| 16 | Sonic Tape |
| 17 | Wall to be Measured |
| 18 | Laser Steering Knob/Potentiometer #1 |
| 20 | Laser Steering Knob/Potentiometer #2 |
| 22 | Laser Locking/Release Button #2 |
| 24 | Display |
| 26 | On/Off Power Switch |
| 28 | Calculate Button |
| 30 | Laser Locking Release Button #1 |
| 32 | Algorithm Stored in Memory |
| 34 | Microprocessor |

DETAILED DESCRIPTION OF THE PREFERRED EMBODIMENTS

FIG. 1 illustrates the real estate electro tape 10 in actual use. The wall to be measured is numeral 17. In use, a sonic tape 16 is aimed at wall 17 to establish the distance between the invention 10 and the wall 17. Sonic tape 16 is a conventional technology already in use and available from various sources. The output of the sonic tape 16 is the perpendicular distance (H) from the wall 17. Next, steerable laser 12 is aimed at one corner of the wall. The user can confirm that the laser is hitting the edge or corner of the wall by observing the reflection of the laser. The beam from 12 makes an angle ($\theta_2$) with the perpendicular. Similarly, steerable laser 14 is aimed at the opposite wall edge or corner to determine angle ($\theta_1$). Note that $\theta_1$ and $\theta_2$ are typically not equal. Since the steerable lasers 12 and 14 are not exactly coincident with the sonic tape 16, the displacement L' from sonic tape 16 must be taken into consideration. The total length of the wall 17 is determined, then, according to the following formula (see FIG. 2):

$$L_T = H \tan \theta_1 + H \tan \theta_2 + 2L'$$

The physical layout of the invention can best be understood with reference to FIGS. 3 and 4. Sonic tape 16 is centrally mounted on the front of 10. Steerable lasers 12 and 14 are mounted at equal distances from sonic tape 16 and are mounted so as to allow the beams to scan in the horizontal plane. Laser steering knob/potentiometer 18 is used to adjust the horizontal position of steerable laser 14 and laser steering knob/potentiometer 20 is used to adjust the horizontal position of steerable laser 12. The steering knobs are locked and released using laser locking/release buttons 22 and 30. Power to 10 is turned on and off using on/off power switch 26. When the distance measurement is desired, calculate button 28 is depressed causing information to be shown on display 24.

Figure 5:
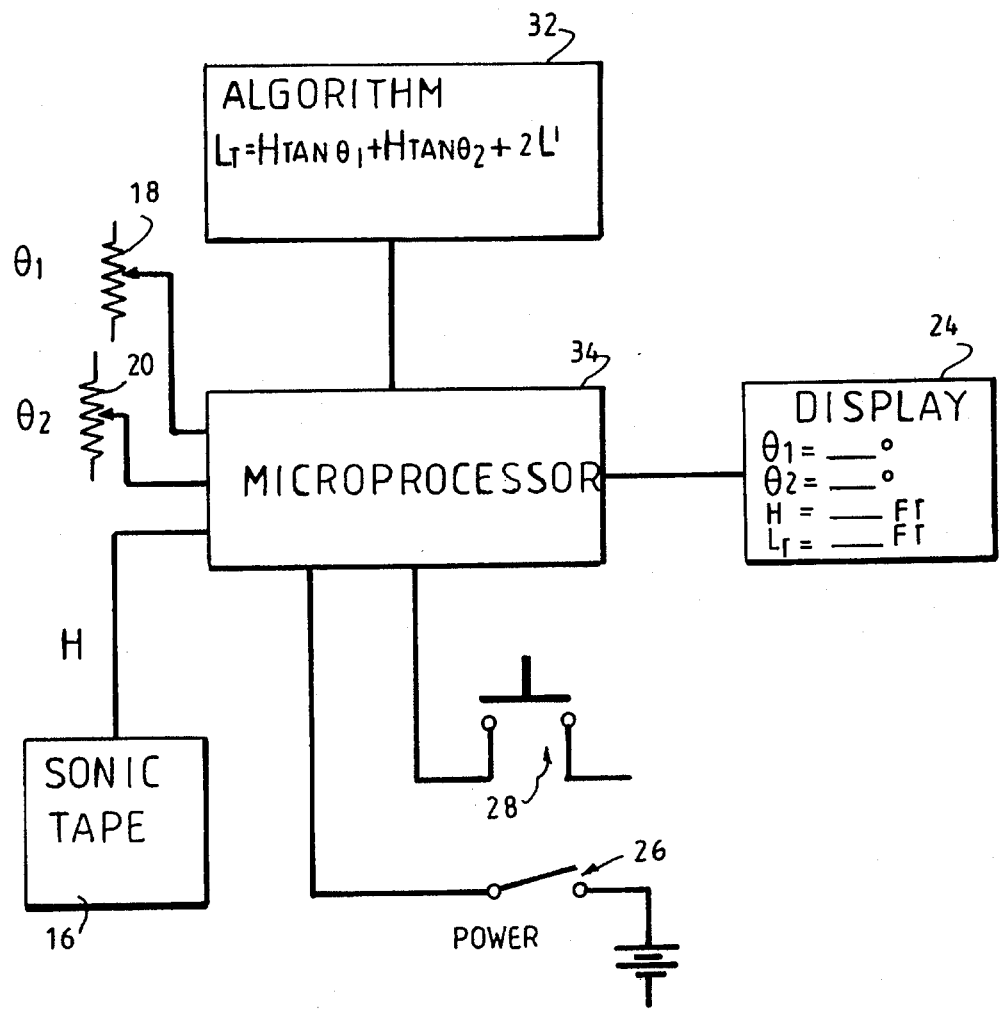
FIG. 5 is an electronic block diagram of the invention.

The electronic operation of the invention is best understood with reference to FIG. 5. Microprocessor 34 processes data from a number of sources according to algorithm 32. The inputs include: the output $\theta_1$ of laser steering knob/potentiometer 18, the output $\theta_2$ of laser steering knob/potentiometer 20, and the output H of sonic tape 16. The output of microprocessor 34 is input to display 24, which is typically a liquid crystal display (LCD) or a light emitting diode display (LED). The information displayed includes $L_T$ and, optionally H, $\theta_1$, and $\theta_2$.

While certain novel features of this invention have been shown and described and are pointed out in the annexed claims, it will be understood that various omissions, substitutions and changes in the forms and the details of the device illustrated and in its operation can be made by those skilled in the art without departing from the spirit of the invention.

What is claimed is:

1. A real estate electro tape, comprising:
   a. a sonic tape wherein said sonic tape is a conventional ultrasonic laser ranging device whose output is the perpendicular distance (H) to a wall whose length is to be measured;
   b. a first steerable laser, mounted in close proximity to said sonic tape, wherein the light beam from said first steerable laser is aimed at one edge of said wall, such that the angle ($\theta_1$) between said light beam and said perpendicular can be determined; and,
   c. a second steerable laser, mounted in close proximity to said sonic tape, wherein the light beam from said second steerable laser is aimed at the opposite edge of said wall, such that the angle ($\theta_2$) between said light beam and said perpendicular can be determined; so that the total length of the wall, $L_T$ can be determined by the formula: $L_T = H \tan \theta_1 + H \tan \theta_2 + 2L'$ where L' is the distance, if any, between said sonic tape and each of said steerable lasers.

2. A real estate electro tape, as recited in claim 1, wherein said first and second steerable lasers have visible beams, and wherein said beams are aimed at corners or edges of said walls by observing the reflection of light off said corners when said steerable lasers are properly aimed.

3. A real estate electro tape, as recited in claim 1, further comprising calculating and display means for outputting said total length as determined by the formula: $L_T = H \tan \theta_1 + H \tan \theta_2 + 2L'$.

4. A real estate electro tape, as recited in claim 3, wherein said calculating means comprise:
   a. a potentiometer attached to said first steerable laser such that the output of said potentiometer is proportional to the angle between said first steerable laser and the perpendicular;
   b. a potentiometer attached to said second steerable laser such that the output of said potentiometer is proportional to the angle between said second steerable laser and the perpendicular;
   c. a memory containing the algorithm: $L_T = H \tan \theta_1 + H \tan \theta_2 + 2L'$; and,
   d. a microprocessor whose data inputs are the outputs of each of said potentiometers and the output of said sonic tape, wherein said microprocessor has as its output the total length $L_T$.

5. A real estate electro tape, as recited in claim 4, wherein said output of said microprocessor further comprises the perpendicular distance to the wall (H), the angle ($\theta_1$) and the angle ($\theta_2$).

6. A real estate electro tape, as recited in claim 3, wherein said display means comprises a liquid crystal display (LCD) showing at least total distance $L_T$.

7. A real estate electro tape, as recited in claim 3, wherein said display means comprises a light emitting diode display (LED) showing at least total distance $L_T$.

8. A real estate electro tape, as recited in claim 3, further comprising a power switch to turn said calculating and display means on and off.

9. A real estate electro tape, as recited in claim 3, further comprising a calculate button to reset said microprocessor and initiate processing according to said algorithm.

10. A real estate electro tape, as recited in claim 3, further comprising laser locking/release buttons, attached to each of said steerable lasers, such that said steerable lasers can be locked into any position and can only be adjusted when said locking/release buttons are in unlocked positions.

* * * * *